United States Patent [19]

Tahara et al.

[11] Patent Number: 4,491,700
[45] Date of Patent: Jan. 1, 1985

[54] HYBRID CIRCUIT IN A TELEPHONE SUBSCRIBER INTERFACE CIRCUIT

[75] Inventors: Toshiyuki Tahara; Hironobu Uehara; Kazuo Hamazato, all of Tokyo; Toshio Hayashi, Saitama, all of Japan

[73] Assignee: Nippon Telegraph and Telephone Public Corporation, Japan

[21] Appl. No.: 325,056

[22] Filed: Nov. 25, 1981

[30] Foreign Application Priority Data

Dec. 20, 1980 [JP] Japan .................. 55-180839

[51] Int. Cl.³ .............................................. H04B 1/58
[52] U.S. Cl. ........................... 179/170 NC; 179/170 T
[58] Field of Search ........... 179/170 T, 170 NC, 81 B

[56] References Cited

U.S. PATENT DOCUMENTS

| | | | |
|---|---|---|---|
| 3,849,609 | 11/1974 | Voorman | 179/170 NC |
| 4,004,109 | 1/1977 | Boxall | 179/170 NC |
| 4,087,647 | 5/1978 | Embree et al. | 179/77 |
| 4,203,012 | 5/1980 | Boxall | 179/170 NC |
| 4,272,656 | 6/1981 | Nishikawa | 179/170 NC |
| 4,300,023 | 11/1981 | Kelley et al. | 179/170 NC |
| 4,358,645 | 11/1982 | Brown | 179/170 NC |

FOREIGN PATENT DOCUMENTS

| | | |
|---|---|---|
| 52-84907 | 7/1977 | Japan . |
| 53-65042 | 6/1978 | Japan . |
| 54-31204 | 3/1979 | Japan . |

OTHER PUBLICATIONS

L. Brown & B. Bynum; "One Chip Closes in on SLIC Functions"; Electronic Design; Sep. 27, 1980; pp. 85–91.

Primary Examiner—Gene Z. Rubinson
Assistant Examiner—Randall P. Myers
Attorney, Agent, or Firm—Martin Novack

[57] ABSTRACT

A hybrid circuit composed of semiconductor current amplifiers without an inductance and large capacitance has been found. The DC speech current supplied by the DC power source (33) and the speech signal from the modem (28) are adjusted by the current amplifiers (17a, 17b) so that the subscriber line (2) is terminated with the predetermined impedance (600 ohms), and the speech signal from the subscriber line (2) is transferred to the modem (28) through the AC monitor circuits (24a, 24b). The common mode noise induced on the subscriber line (2) is cancelled by adjusting the input current of said current amplifiers (17a, 17b) by the common mode noise detector (22) and the common mode noise monitor circuits (23a, 23b). The speech signal from the modem (28) to the subscriber line (2) does not return to the modem (28) because of the cancellation operation by the return signal detector circuit (32). The present hybrid circuit is suitable to compose a semiconductor integrated circuit (IC) because no inductance is used and no large capacitor is used.

3 Claims, 8 Drawing Figures $$\begin{cases} I_2 = AI_1 \\ I_3 = BI_1 \\ I_0 = I_1 + I_2 + I_3 \end{cases}$$

HYBRID CIRCUIT IN A TELEPHONE SUBSCRIBER INTERFACE CIRCUIT

BACKGROUND OF THE INVENTION

The present invention relates to a hybrid circuit in the interface circuit between a subscriber circuit and a telephone switching system in a telephone exchange system and, in particular, relates to such a circuit which is suitable for fabrication in an integrated circuit.

First, a prior hybrid circuit is described in accordance with FIG. 1. In the figure, the reference numeral 1 is a telephone set or a subscriber terminal, 2 is a subscriber line, 3 and 4 are input and/or output terminals of a subscriber interface circuit, 5 is a power source, 6 is an inductance in a speech current supply circuit, 7 is a hybrid circuit which has a hybrid transformer 8 and the resistors 9 and 10 and the circuit 11 having a resistor and a capacitor. The reference numerals 12 and 13 are terminals coupled with a modem (not shown) for transmitting and/or receiving a speech signal, 14 is a relay contact for detecting the ON or OFF status of the loop circuit in the subscriber terminal 1, 15 is an output terminal of said relay contact 14, and 16 is a capacitor for preventing DC current.

In the above circuit, a speech current is supplied from the DC power source 5 to the subscriber terminal 1 through the inductances 6, each of which has usually the DC resistance 220 ohms. The connection or the disconnection of the loop circuit of a subscriber terminal 1 is detected by a relay contact 14 and the output terminal 15. The speech signal from the subscriber terminal 1 is terminated by the resistors 9 and 10 each having the resistance $r_0$ through the hybrid transformer 8, and said speech signal is also applied to the modem (not shown) through the terminals 12. It is assumed that the impedance of the capacitor 16 is small enough as compared with the impedance of the inductances 6 and the impedance of the hybrid transformer 8. Assuming that the winding ratio of the hybrid transformer 8 is L:M, then, the resistance $r_0$ of the resistors 9 and 10 has the equivalent effect of $2(M/L)^2 r_0$ at the primary side of the hybrid transformer 8. On the other hand, the speech signal from the modem (not shown) through the terminal 13 is transferred to the subscriber terminal 1 through the subscriber line 2. It is assumed that the circuit 11 has the impedance $M^2 Z_L$ in order to minimize the stray signal from the input terminal 13 to the output terminal 12 through the hybrid circuit, where $Z_L$ is the impedance of the subscriber line 2 and the subscriber terminal 1 at the terminals 3 and 4.

However, the prior hybrid circuit of FIG. 1 has the disadvantage that the size of the circuit can not be small, and the weight of the circuit can not be light, because the transformer 8 must be large since both the AC current and the DC current flow in the transformer 8 and thus the DC resistance of the coils of the transformer 8 must be small, and the capacitor 16 must have large capacitance for improving the transmission characteristic for the speech signal. Further, the characteristics of the hybrid transformer 8 is not stable, because the trasmission characteristics of the transformer 8 depends upon the DC current superposed on a speech signal.

SUMMARY OF THE INENTION

It is an object, therefore, of the present invention to overcome the disadvantages and limitations of a prior hybrid circuit by providing a new and improved hybrid circuit.

It is also an object of the present invention to provide a new and improved hybrid circuit which is small in size, and is suitable to fabricate in an integrated circuit chip, which does not includes a magnetic component like a transformer, and does not have a large capacitance, but is composed of only semiconductor components.

The above and other objects are attained by a hybrid circuit comprising a pair of input terminals (3, 4) connected to a subscriber line (2); a DC power supply (33) for supplying speech current to a telephone set (1) through said subscriber line (2); a pair of current amplifiers (17a, 17b) each output of which is connected to said terminals (3, 4), respectively, for supplying DC current and speech signal to said telephone set (1), the first inputs of said current amplifiers (17a, 17b) being coupled with the ground and said power source (33), respectively, and the second inputs of said current amplifiers being coupled with a current source (18) through a plurality of nodes, so that the current from the power source (33) to the subscriber line is adjusted by the control current in said second inputs; a resistor network (19) coupled with said terminals (3, 4); a pair of DC monitor circuits (20a, 20b) for adjusting the speech current from said current amplifiers (17a, 17b) by supplying the control current to the nodes (a, a') in the path of said second inputs of said current amplifiers (17a, 17b), according to the voltage across the output of said resistor network (19) and the ground; a pair of AC monitor circuits (24a, 24b) which receive an output signal from said resistor network (19) through a pair of capacitors (25a, 25b), adjusting said current amplifiers (17a, 17b) by controlling the nodes (c, c') in the control path of said current amplifiers (17a, 17b) so that the subscriber line (2) is terminated with the predetermined impedance (600 ohms), and forwarding speech signal to a modem (28) through the terminals (T$_0$, T$_1$); a pair of transmitters (26, 27) receiving speech signal from the modem (28) through the terminals (R$_0$, R$_1$) and said transmitters (26, 27) adjusting said current amplifiers (17a, 17b) by controlling the nodes (d, d') in the control path of said current amplifiers by applying the output signal of the transmitters (26, 27) to said nodes (d, d'); and a return signal detection circuit (32) receiving output signal of one (26) of said transmitters (26, 27) and cancelling the return signal from the terminals (R$_0$, R$_1$) of the modem (28) to the terminals (T$_0$, T$_1$) of the modem (28) through the subscriber line (2), the resistor network (19), and the AC monitor circuits (24a, 24b), by adjusting the nodes (e, e') in the path between the outputs of said AC monitor circuits (24a, 24b) and the terminals (T$_0$, T$_1$) of the modem (28).

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENT

Figure 2:
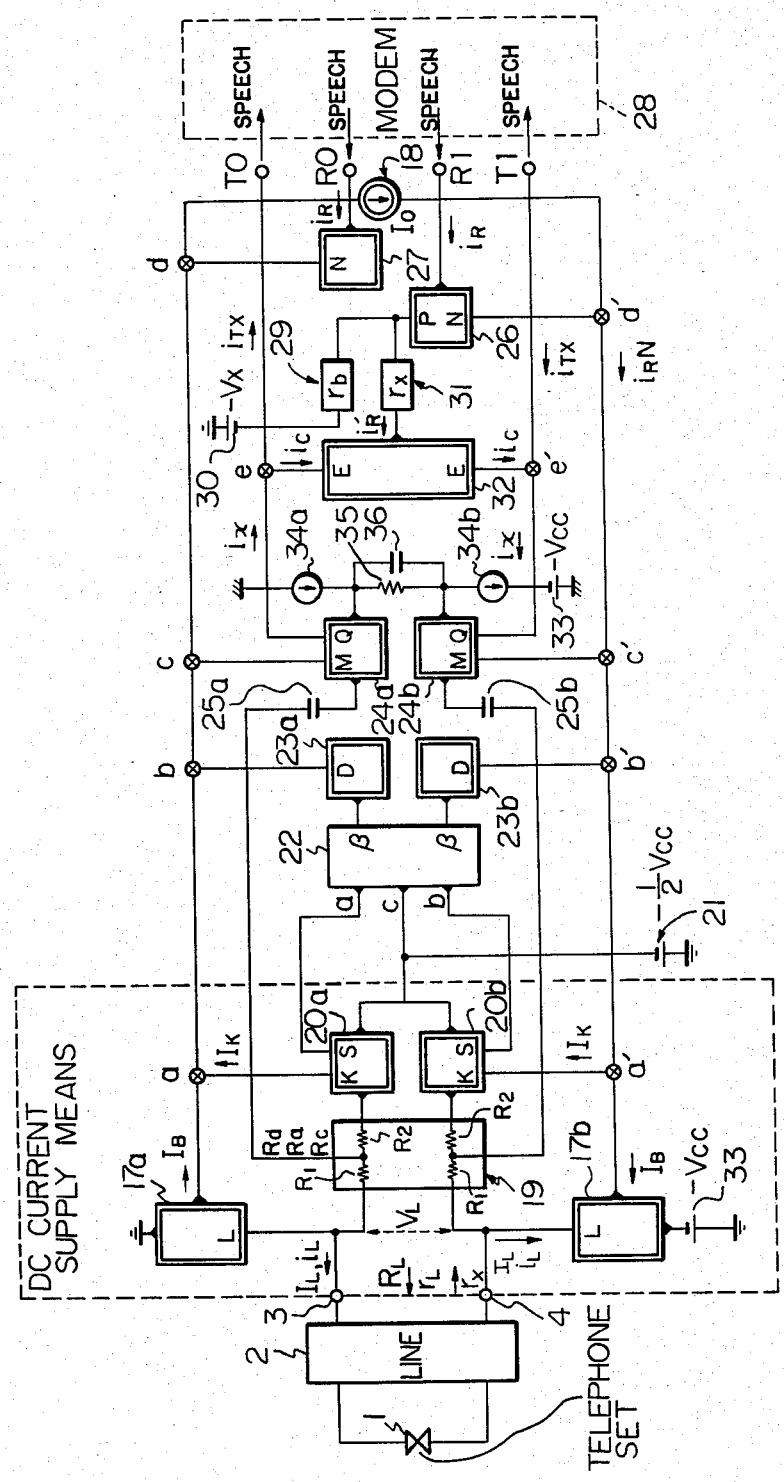
FIG. 2 shows a hybrid circuit according to the present invention.

FIG. 2 shows a subscriber line interface circuit which includes the hybrid circuit according to the present invention. That interface circuit is arranged between the subscriber line 2 and the modem 28 which is coupled with an exchange system (not shown).

In FIG. 2, the reference numeral 1 is a subscriber terminal or a telephone set, 2 is a subscriber line connecting the telephone set and the present subscriber line interface circuit, 3 and 4 are input/output terminals of the present subscriber interface circuit.

The reference numerals 17a and 17b are a pair of current amplifiers, the outputs of which are connected to the subscriber telephone set 1 through the terminals 3 and 4. The first inputs of those current amplifiers are coupled with the ground and the DC power source 33, respectively, and the second inputs of those current amplifiers are coupled with the constant current source 18 through a plurality of nodes (a, a'; b, b'; c, c'; d, d'). Those nodes operate to sum the current from the constant current source 18 to each control current for controlling said current amplifiers 17a and 17b. The voltage of said DC power supply is usually −48 volts. Those current amplifiers 17a and 17b are implemented by a current amplifier with a gain L in which the output current to the subscriber telephone set is $L \cdot I_B$ where $I_B$ is the input current into the first input.

Figure 4:
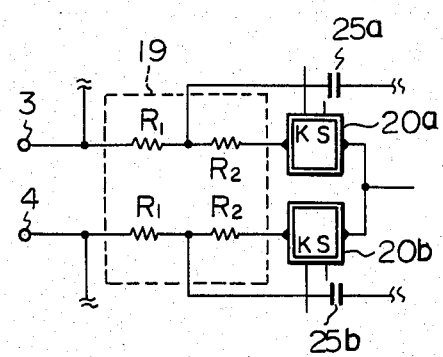
FIG. 4 shows an embodiment of a resistor circuit network.

The reference numeral 19 is a resistor network having a pair of series connected resistors $R_1$ and $R_2$ (see FIG. 4). That resistor network 19 is coupled with the subscriber telephone set 1 through the terminals 3 and 4 to monitor the status of the subscriber telephone set.

The reference numerals 20a and 20b are a pair of DC monitor circuits which are coupled with the subscriber telephone set 1 through said resistor network 19 to monitor the DC status of the subscriber line 2 and/or the subscriber telephone set 1. The DC monitor circuits 20a and 20b control the input current of said current amplifiers 17a and 17b by the nodes a and a' according to the DC status of the subscriber line 2. Thus, the DC current in the subscriber line 2 is adjusted by the DC monitor circuits 20a and 20b. Said DC monitor circuits provide the intermediate potential between the power source $-V_{cc}$ and the ground by the power source 21. Those DC monitor circuits are also implemented by a current amplifier which has the gain K and S for each outputs.

The reference numeral 22 is a common mode noise detector for detecting the common mode noise on the subscriber line 2. That common mode noise detector 22 is also implemented by a current amplifier which has the gain $\beta$.

The reference numerals 23a and 23b are a pair of common mode noise monitor circuits for controlling said current amplifiers 17a and 17b by supplying the current into the nodes b and b' for cancelling the common mode noise induced on the subscriber line 2. Those circuits 23a and 23b are also implemented by a current amplifier with the gain D.

The reference numerals 24a and 24b are a pair of AC monitor circuits which are supplied a speech signal from the coupling points of said resistor network 19 through a pair of capacitors 25a and 25b, and function to terminate the subscriber line 2 with the predetermined impedance (600 ohms) by adjusting the input current into said current amplifiers 17a and 17b by means of the current into the nodes c and c', and also function to transfer a speech signal to the modem 28 through the terminals $T_0$ and $T_1$. It should be appreciated that the capacitance of the capacitors 25a and 25b is considerably smaller than that of a prior capacitor 16 in FIG. 1, because while the impedance of a prior capacitor 16 in FIG. 1 must be small enough as compared with predetermined impedance (which is usually 600 ohms), the impedance of the present capacitors 25a and 25b has only to be small as compared with the resistance in the resistor network 19. Therefore, a prior capacitor 16 in FIG. 1 must be larger than 2 $\mu$F, however, the present capacitors can be 0.2 $\mu$F or less than the resistance in the resistors in the resistor network 19 is higher than 6 kilo-ohms. Said AC monitor circuits are also implemented by a current amplifier with the gain M and Q for each of the outputs.

The reference numerals 26 and 27 are a pair of signal transmitters which transfer the speech signal from the modem 28 through the terminals $R_0$ and $R_1$ to the subscriber telephone set 1 by controlling the input current into said current amplifiers 17a and 17b through the control of the nodes d and d'. Said transmitters 26 and 27 are also implemented by a current amplifier with the gain N and/or P for each outputs.

The reference numeral 29 is the resistor having the impedance equal to the impedance of the subscriber line and/or the subscriber telephone set.

The reference numeral 30 is the power source for energizing said resistor 29.

The reference numeral 31 is another resistor for providing the input impedance of the present interface circuit viewed at the terminals 3 and 4. Said resistor 31 is usually 600 ohms.

The reference numeral 32 is the return signal detection circuit, which has a current amplifier of gain E, with dual outputs, as represented in the FIGURE by the two E's. The input signal of that return signal detection circuit 32 is the current in the impedance $r_x(31)$ which is coupled in parallel with another impedance $r_b(29)$ as far as the speech signal (alternating current) is concerned. Those parallel impedances $r_x(31)$ and $r_b(32)$ are coupled with one output (gain p) of the transmitter 26. That transmitter 26 and another transmitter 27 receive a signal from the modem 28 through the terminals $R_0$ and $R_1$. The outputs of the return signal detection circuit 32 are applied to the nodes (e, e'), and cancel the second outputs (gain Q) of the AC monitor circuits 24a, 24b, as described further hereinbelow in the section entitled "Cancellation of Return Signal". Thus, the signal from the modem 28 to the subscriber terminal 1 through the terminals $R_0$, $R_1$ does not return to the modem 28 through the terminals $T_0$, $T_1$.

The reference numeral 33 is the DC power source for providing the speech current to the telephone set 1.

The reference numeral 34 is a constant current source, 35 is a resistor, and 36 is a capacitor.

The symbols a, a', b, b', c, c', d and d' are nodes for adjusting the input current into said current amplifiers 17a and 17b, by adding the output current of said DC monitor circuits 20a and 20b, the common mode noise detection circuits 23a and 23b, the AC monitor circuits 24a and 24b, and the signal transmitters 26 and 27, respectively.

The symbols e and e' are nodes for adjusting the current from the AC monitor circuits 24a and 24b to the modem 28 through the terminals $T_0$ and $T_1$, for cancelling the return signal when the modem forwards the speech signal to the subscriber telephone set 1.

In the above configuration, the components 17a, 17b, 19, 20a, 20b, and 33, which are circled by the dotted line provide a DC current supply means which supplies the DC speech current to a subscriber telephone set.

As mentioned above, the components 17a, 17b, 20a, 20b, 22, 23a, 23b, 24a, 24b, 26, 27 and 32 are implemented by a current amplifier which is composed of merely a semiconductor integrated circuit.

Now, the operation of the present circuit of FIG. 2 is described.

DC operation

The input current $I_B$ into the current amplifiers 17a and 17b is the sum of the current $I_O$ from the current source 18 and the current $I_K$ which is the output current of the terminal K of the DC monitor circuits 20a and 20b. And, that current $I_B$ from the nodes a and a' to the current amplifiers 17a and 17b is shown below:

$$I_B = I_O - I_K = I_O - \frac{(R_L/2)I_L}{R_d} \cdot K \tag{1}$$

where $I_L$ is the DC current supplied to the subscriber telephone set 1 through the subscriber line 2, $R_L$ is the loop resistance of the subscriber line 2 and the subscriber telephone set 1 viewed from the terminals 3 and 4, $R_d$ is the resistance of the resistor network 19 between the input terminal of the DC monitor circuits 20a and 20b, and the terminals 3 and 4, and said value $R_d$ is equal to $R_1 + B_2$ (see FIG. 4), K is the gain of the DC monitor circuits 20a and 20b for the output coupled with the nodes a and a', L is the gain of the current amplifiers 17a and 17b between the output current $(LI_B)$ and the input current $I_B$, and $I_O$ is the current from the common current source 18.

Assuming that the current into the resistor network 19 is almost zero (it is true since the resistance $R_d$ is usually higher than 10 kilo-ohms), the current $I_L$ supplied to the subscriber telephone set 1 from the current amplifiers 17a and 17b is shown below.

$$I_L = L \cdot I_B = L \left( I_O - \frac{(R_L/2)I_L}{R_d} \cdot K \right) \tag{2}$$

Accordingly, the following equation (3) is obtained.

$$I_L = \frac{(2R_d/K)I_O}{R_L + (2R_d/(KL))} \tag{3}$$

In the equation (3), the term $2R_d/(KL)$ corresponds to the resistance in the hybrid circuit, and the term $(2R_d/K)I_O$ corresponds to the power source voltage, and usually, the former is 220 ohms, and the latter is −48 volts. Therefore, the values K, K, $I_O$, and $R_d$ are designed to satisfy the following equations (4) and (5).

$$2R_d/(KL) = (2 \times 220) \text{ ohms} \tag{4}$$

$$(2R_d/K_L)I_O = -48 \text{ volts} \tag{5}$$

It should be appreciated that the speech current to the subscriber telephone set 1 is not directly supplied from the power source 33, but that speech current is supplied through the current amplifiers 17a and 17b. Therefore, any noise generated in the power source 33 does not influence the speech current.

AC operation

The relation of the equation (6) is satisfied between the AC voltage $v_L$ across the terminals 3 and 4, and the AC speech current $i_L$ in the subscriber line 2:

$$i_L = \frac{v_L}{2} \cdot \frac{1}{R_a + (1/j\omega C)} \cdot ML \tag{6}$$

where $v_L$ is the AC voltage across the terminals 3 and 4, $i_L$ is the AC speech current in the subscriber line 2, and $R_a$ is the resistance of the resistor network 19 between the terminals 3 and 4, and the capacitors 25a and 25b, and $R_a$ is equal to $R_1$ (see FIG. 4), M is the gain of the AC monitor circuits 24a and 24b between the input of the same and the outputs M which are coupled with the nodes c and c'.

It is also assumed that the resistance $R_2$ (see FIG. 4) is sufficiently large as compared with the sum of the resistance $R_1$ and the impedance of the capacitors 25a and/or 25b.

When the impedance $(1/(j\omega C))$ of the capacitors 25a and 25b is sufficiently small as compared with the resistance $R_a$, then, the impedance $v_L/i_L$ across the terminals 3 and 4 towards the present interface circuit is shown below.

$$v_L/i_L = (2R_a)/(ML) \tag{7}$$

It should be appreciated that the value of the equation (7) can be easily designed to be equal to the predetermined impedance (usually 600 ohms) by designing the values $R_a$, M and L.

Figure 1:
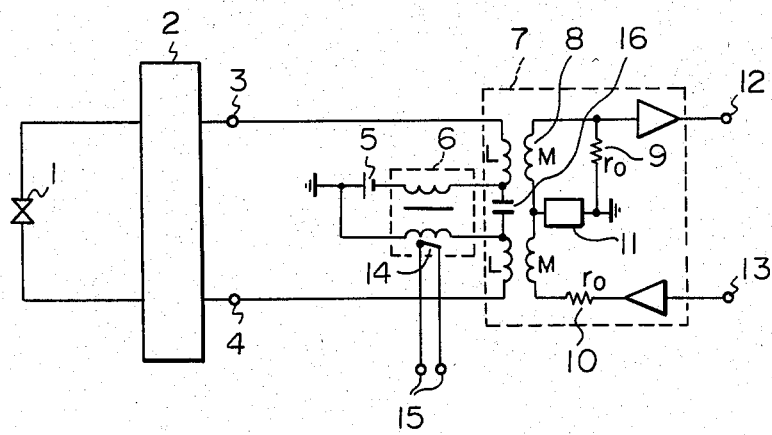
FIG. 1 shows a prior hybrid circuit for a telephone subscriber interface circuit.

Further, it should be noted that the capacitance of the capacitors 25a and 25b may be smaller than that of a prior capacitor 16 in FIG. 1, because of the presence of the resistor network 19. It is enough that the impedance of the capacitors 25a and 25b is sufficiently small as compared with the resistance in the resistor network 19, while the prior capacitor 16 is FIG. 1 must have the sufficiently small impedance as compared with the predetermined impedance (600 ohms). Since the resistance in the resistor network 19 may be higher than 10 kilo-ohms, the capacitors less than 0.2 μF are available for the capacitors 25a and 25b. It should be noted that the capacitance of a prior capacitor 16 in FIG. 1 is usually higher than 2 μF.

The speech signal from the subscriber telephone set 1 is then transferred to the modem 28 through the terminals 3 and 4, the resistor network 19, the capacitors 25a and 25b, the outputs Q of the AC monitor circuits 24a and 24b, and the terminals $T_0$ and $T_1$.

Speech signal from modem 28 to subscriber set 1 through terminals $R_0$ and $R_1$ When the modem 28 forwards the speech signal to the present interface circuit through the terminals $R_0$ and $R_1$, that speech signal is transferred to the subscriber telephone set 1 through the transmitters 26 and 27, the nodes d and d', the current amplifiers 17a and 17b and the terminals 3 and 4. At the same time, the speech signal at the terminals 3 and 4 forwarded by the modem 28 returns to the nodes c and c' through the resistor network 19, the capacitors 25a and 25b, and the outputs M of the AC monitor circuits 24a and 24b. Therefore, considering the speech signal in both the ways, the following equation (8) is satisfied:

$$L(-i_L r_L(1/2)(M/R_a) + i_R N) = i_L \quad (8)$$

where $r_L$ is the AC impedance across the terminals 3 and 4 towards the subscriber line 2, $i_L$ is the AC current in the subscriber line 2 supplied from the terminals 3 and 4, $i_R$ is the AC current from the modem 28 to the transmitters 26 and 27, and N is the gain at the outputs N which are coupled with the nodes d and d', of the transmitters 26 and 27.

In the equation (8), the first term of the left side relates to the return signal, and the second term relates to the forward signal.

The equation (8) is changed to the equation (9).

$$i_L = \frac{2R_a/(ML)}{r_L + 2R_a/(ML)} \cdot NLi_R \quad (9)$$

The equation (9) shows that the speech current $i_R$ from the modem 28 is multiplied by (NL), and that multipled current ($i_R$NL) is transmitted to the subscriber telephone set 1 with the output impedance $2R_a/(ML)$. It should be appreciated by comparing the equation (9) with the equation (7), that the impedance $2R_a/(ML)$ of the equation (9) is the same as that of the equation (7). Therefore, the values $R_a$, M and L are designed so that the impedance is the predetermined value (usually 600 ohms).

CANCELLATION OF RETURN SIGNAL

Next, the operation for cancellation of the return signal from the modem 28 through the terminals $R_0$ and $R_1$ to the modem 28 itself through the terminals $T_0$ and $T_1$ is described. That return path is provided by the path from the terminals $R_0$ and $R_1$, through the transmitters 26 and 27, the nodes d and d+, the current amplifiers 17a and 17b, the terminals 3 and 4, the resistor network 19, the capacitors 25a and 25b, the outputs Q of the AC monitor circuits 24a and 24b, to the terminals $T_0$ and $T_1$.

The speech signal current $i_R$ from the modem 28 is amplified by the transmitter 26 by the gain P, and the output current ($Pi_R$) of the transmitter 26 is applied to the impedance circuits 29 and 31 which are coupled parallel with each other as far as the speech signal (AC signal) is concerned. When the impedance of those impedance circuits is $r_b$ and $r_x$, respectively, the speech signal $i_R'$ applied to the return signal detection circuit 32 is shown below.

$$i_R' = (r_b/(r_b + r_x))Pi_R$$

Supposing that the gain of the return signal detection circuit 32 is E, then, the current $i_c$ supplied to the nodes e and e' from the output E of the return signal detection circuit 32 is shown below.

$$i_c = Ei_R' = (r_b/(r_b + r_x))PEi_R \quad (10)$$

On the other hand, the speech signal at the terminals $R_0$ and $R_1$ from the modem 28 provides the signal current $i_L$ in the subscriber line 2 as shown by the equation (9). That current $i_L$ returns to the outputs Q of the AC monitor circuits 24a and 24b, through the resistor network 19 and the capacitors 25a and 25b. The output current $i_x$ at the outputs Q of the AC monitor circuits 24a and 24b by said signal of the level $i_L R_L$ through the resistance network 19 and the capacitors 25a, 25b is $i_x = i_L r_L(\frac{1}{2})(Q/R_a)$. Therefore, that current $i_x$ is shown below considering the equation (9).

$$i_x = i_L r_L(1/2)(Q/R_a) \quad (11)$$

$$= \frac{(2R_a/ML)r_L(Q/R_a)}{r_L + 2R_a/(ML)} \cdot NLi_R(1/2)$$

When the values $r_x$ and P are designed so that the relations $2R_a/(ML)=r_x$ which is equal to the terminal impedance (usually 600 ohms) of the present apparatus as shown in the equations (7) and (9), and $EP=(N/M)Q$ are satisfied, the current $i_{TX}$ at the nodes e and/or e' is shown below.

$$i_{TX} = i_c - i_x = (r_b/(r_b + r_x) - r_L/(r_L + r_x))EPi_R \quad (12)$$

The value $i_{TX}$ of the equation (12) can be zero by designing the resistance $r_b$ equal to the impedance $r_L$, which is the line impedance at the terminals 3 and 4 towards the subscriber line 2. Thus, the return signal is completely cancelled, and no signal is induced at the terminals $T_0$ and $T_1$ by the speech signal at the terminals $R_0$ and $R_1$.

Operation for common mode noise on a line

Next, the operation when the common mode noise is induced on a subscriber line is described. As described above, the speech signal together with the common mode noise are applied to the AC monitor circuits 24a and 24b, and the DC monitor circuits 20a and 20b. In this case, the AC monitor circuits 24a and 24b do not respond to the common mode noise, since those AC monitor circuits are terminated by the high impedance constant current sources 34, and the low impedance circuit with the resistance 35 and the capacitance 36.

Therefore, the current induced by the common mode noise is applied to the DC monitor circuits 20a and 20b through the resistor network 19. The DC monitor circuits 20a and 20b amplifies the noise with the gain S, and the amplified outputs are applied to the common mode noise monitor circuits 23a and 23b through the common mode noise detector 22 which provides the gain B. Said common mode noise monitor circuits 23a and 23b amplify the input signals with the gain D, and the outputs of the same are applied to the nodes b and b'.

Accordingly, the following equation is satisfied:

$$i_{CM} = (V_{CM}/R_C) \cdot S \cdot B \cdot D \cdot L \quad (13)$$

where $R_C$ is the resistance between the terminal 3 or 4, and the inputs of the DC monitor circuits 20a or 20b, and said $R_C$ is equal to $R_1+R_2$ of the resistor network 19, and $V_{CM}$ and $i_{CM}$ are the common mode noise voltage, and the common mode noise current across the terminals 3 and 4, respectively.

Accordingly, the impedance $Z_C$ for the common mode noise at the terminals 3 and 4 towards the subscriber line 2 is shown below.

$$Z_C = V_{CM}/i_{CM} = R_C/(S \cdot \beta \cdot D \cdot L) \tag{14}$$

When the value $(S \cdot \beta \cdot D \cdot L)$ is sufficiently large as compared with the value $R_C$, the impedance $Z_C$ becomes almost zero, and therefore, the common mode noise induced on the subscriber line is almost attenuated, and is not transferred to the modem 28.

FIGS. 3(a) through 3(e) show the embodiments of a current amplifier for the implementation of 20a, 20b, 22, 23a, 23b, 24a, 24b, 32, 26, 27, 17a and 17b in FIG. 2.

Figure 3A:
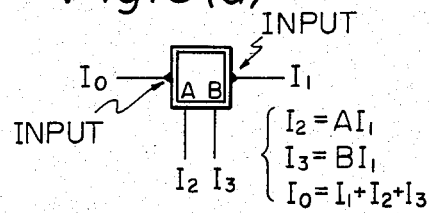
FIGS. 3(a), 3(b), 3(c), 3(d) and 3(e) are examples of a current amplifier having a predetermined gain.

FIG. 3(a) shows the symbol of the current amplifier in the present specification. In FIG. 3(a), $I_0$ and $I_1$ are input current, and $I_2$ and $I_3$ are output current. When the current amplifier has two outputs, each gain of each output is A and B, respectively, and the relations $I_2 = AI_1$, $I_3 = BI_1$, and $I_0 = I_1 + I_2 + I_3$ are satisfied.

Figure 3B:
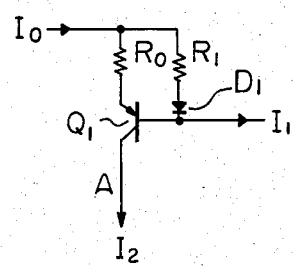

FIG. 3(b) is the embodiment of a current amplifier which has only one output, and is used for the implementation of 17a and 17b in FIG. 2. In FIG. 3(b), due to the voltage drop in the base-emitter of the transistor Q, and the forward voltage drop in the diode $D_1$, the voltage drop $I_2R_0$ in the resistor $R_0$ is equal to the voltage drop $I_1R_1$ in the resistor $R_1$, and the gain $A = R_1/R_0$ is obtained.

Figure 3C:
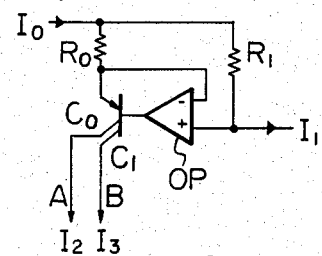
Figure 3D:
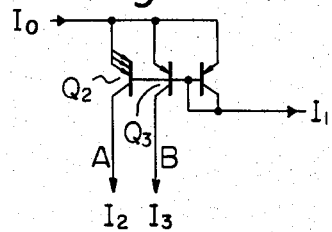

FIG. 3(c) and FIG. 3(d) are the embodiments using a multi-collector and multi-emitter transistor which is implemented by an integrated circuit (IC), and have a pair of inputs and a pair of outputs. In FIG. 3(c), the gain A for the output $I_2$ and the gain B for the output $I_3$ are:

$$A = (R_1/R_0)(C_0/(C_0+C_1)), \text{ and}$$

$$B = (R_1/R_0)(C_1/(C_0+C_1))$$

where $C_0$ and $C_1$ are areas of the collectors for the output currents $I_2$ and $I_3$, respectively. The symbol OP in FIG. 3(c) is an operational amplifier. In FIG. 3(d), when the ratio of the emitters of the transistors $Q_2$ and $Q_3$ is 3:1, then, the gain $A = 1$ and the gain $B = 1$ are obtained.

Figure 3E:
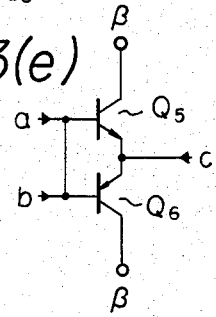

FIG. 3(e) is the embodiment for the current amplifier for the common mode noise detector 22 in FIG. 2, and is implemented by a pair of transistors. The symbols a, b and c are input terminals, and the symbol B shows the outputs with the gain B.

FIG. 4 shows the embodiment of the resistor network 19 in FIG. 2, and said network has a pair of series connected resistors $R_1$ and $R_2$ between the terminals 3 or 4, and the input terminal of the DC monitor circuit 20a or 20b. The resistance $R_a$, $R_b$ and $R_c$ mentioned before are expressed as follows using the resistance $R_1$ and $R_2$:

$$R_d = R_c = R_1 + R_2, \text{ and } R_a = R_1$$

As mentioned above in detail, the present invention replaced a coil, a transformer, and/or a large capacitor by a semiconductor component in a hybrid circuit in a subscriber interface circuit between a subscriber line coupled with a subscriber telephone set, and a modem coupled with an exchange system. Accordingly, the present device is easily accomplished by using an integrated circuit (IC), and then, the miniaturized subscriber interface circuit can be realized. Further, the size of the device is decreased, and the manufacturing cost of the device is lowered.

From the foregoing, it will now be apparent that a new and improved hybrid circuit, and/or a subscriber interface circuit has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A hybrid circuit for a telephone subscriber interface circuit comprising:
    a pair of input terminals (3, 4) connected to a subscriber line (2),
    a DC power source (33) for supplying speech current to a telephone set (1) through said subscriber line (2),
    a pair of current amplifiers (17a, 17b) the outputs of which are connected to said subscriber input terminals (3, 4), respectively, for supplying DC current and speech signal to said telephone set (1), first inputs of said current amplifiers (17a, 17b) being coupled with ground and said power source (33), respectively, and second inputs of which are coupled with a current source (18) through a plurality of nodes, so that the current from the power source (33) to the subscriber line is adjusted by the control current in said second inputs,
    a resistor network (19) coupled with said subscriber input terminals (3, 4),
    a pair of DC monitor circuits (20a, 20b) for adjusting the speech current from said current amplifiers (17a, 17b) by supplying control current to a first pair of nodes (a, a') in the path of said second inputs of said current amplifiers (17a, 17b), according to the voltage across the output of said resistor network (19) and ground,
    a pair of AC monitor circuits (24a, 24b) which are coupled to subscriber input terminals (3, 4) through the resistance network (19) and respective capacitors (25a, 25b), providing first outputs to the pair of current amplifiers (17a, 17b) through a second pair of nodes (c, c') to provide a predetermined terminal impedance to a speech signal across the subscriber input terminals (3, 4) and providing second outputs related to the speech signal across subscriber input terminals (3, 4) to the modem input terminals ($T_0$, $T_1$) of a modem (28) through a third pair of nodes (e, e'),
    a pair of transmitters (26, 27) which receive a speech signal from the modem (28) through modem output terminals ($R_0$, $R_1$), said transmitters (26, 27) adjusting said current amplifiers (17a, 17b) by controlling a fourth pair of nodes (d, d') in the control path of said current amplifiers by applying the output signal of the transmitters (26, 27) to said fourth pair of nodes (d, d'),
    a return signal detection circuit (32) receiving an output signal of one (26) of said transmitters (26, 27) through an impedance $r_x$(31) which is coupled in parallel with another impedance $r_b$(29) which couples between said one (26) of said transmitters and a further power source 30, said impedance $r_x$(31) being equal to a terminal impedance of the present apparatus across the subscriber input terminals (3, 4), and said impedance $r_b$(29) being equal to a line impedance of a subscriber line (2) across the subscriber input terminals (3, 4), the output of said return signal detection circuit (32) being applied to the third pair of nodes (e, e') where return signal is cancelled by said output of the return signal detection circuit (32), said return signal being originated across the subscriber input terminals (3, 4) and applied to said third pair of nodes (e, e') through the resistance network (19), the respective capacitors (25a, 25b) and the AC monitor circuits (24a, 24b).

2. A hybrid circuit for a telephone subscriber interface circuit according to claim 1, wherein said current amplifiers (17a, 17b), said DC monitor circuits (20a, 20b), said AC monitor circuits (24a, 24b), said transmitters (26, 27), and said return signal detection circuit (32) are implemented by a current amplifier with a predetermined gain.

3. A hybrid circuit according to claim 2, wherein the characteristic impedance of the subscriber line is 600 ohms.

* * * * *